US012670234B2

(12) United States Patent　　　　　(10) Patent No.:　US 12,670,234 B2
Wright et al.　　　　　　　　　　　　(45) Date of Patent:　　Jun. 30, 2026

(54) PROGRESS ESTIMATION OF ITERATIVE HIERARCHICAL CLUSTERING ALGORITHMS

(71) Applicant: International Business Machines Corporation, Armonk, NY (US)

(72) Inventors: Holly Wright, Studio Village (AU);
Jared Ryan Hayward, Southport (AU);
Wayne Francis Tackabury, West
Tisbury, MA (US); Melanie Hanson,
Ashmore (AU); Yair Allouche, Dvira
(IL)

(73) Assignee: International Business Machines Corporation, Armonk, NY (US)

( * ) Notice: Subject to any disclaimer, the term of this
patent is extended or adjusted under 35
U.S.C. 154(b) by 849 days.

(21) Appl. No.: 18/149,836

(22) Filed: Jan. 4, 2023

(65) Prior Publication Data

US 2024/0220583 A1　　Jul. 4, 2024

(51) Int. Cl.
*G06F 18/231*　　　　(2023.01)
(52) U.S. Cl.
CPC ................................. *G06F 18/231* (2023.01)
(58) Field of Classification Search
None
See application file for complete search history.

(56) References Cited

U.S. PATENT DOCUMENTS

| 9,424,337 B2 | 8/2016 | Hall et al. |
| 10,042,912 B2 | 8/2018 | Levitan et al. |

| 11,361,219 B1 | 6/2022 | Bhattacharyya et al. | |
| 2018/0018586 A1* | 1/2018 | Kobayashi ............. | G06N 20/00 |
| 2020/0327448 A1* | 10/2020 | Yakovlev ............... | G06N 3/048 |

FOREIGN PATENT DOCUMENTS

| CN | 104123214 B | 7/2017 |
| CN | 111126470 A | 5/2020 |

OTHER PUBLICATIONS

Calciu et al.; "Black-Box Concurrent Data Structures for NUMA
Architectures"; ASPLOS'17; 2017; pp. 207-221.

(Continued)

*Primary Examiner* — Kannan Shanmugasundaram
(74) *Attorney, Agent, or Firm* — CANTOR COLBURN
LLP; Stosch Sabo Sabo

(57)　　　　　　ABSTRACT

An example method includes initiating training of an hier-
archical clustering algorithm using training data. The
method further includes determining a first factor, the first
factor being a number of analyzed nodes compared to a
number of discovered nodes. The method further includes
determining a second factor, the second factor being a first
time elapsed compared to a first typical training duration for
environments with a data set size substantially similar to a
data set size of the training data. The method further includes
determining a third factor, the third factor being a second
time elapsed compared to a second typical training duration
for environments with a data having a uniformity substan-
tially similar to a uniformity of the training data. The method
further includes estimating a progress of the training of the
hierarchical clustering algorithm based at least in part on the
first factor, the second factor, and the third factor.

20 Claims, 9 Drawing Sheets

(56) References Cited

OTHER PUBLICATIONS

Gülağiz et al.; "Comparison of Hierarchical and Non-Hierarchical Clustering Algorithms"; International Journal of Computer Engineering and Information Technology; vol. 9, No. 1; 2017; pp. 6-14.

Kull et al.; "Fast Approximate Hierarchical Clustering Using Similarity Heuristics"; BioData Mining; vol. 1, No. 9; 2008; 14 Pages.

Likas et al.; "The Global K-Means Clustering Algorithm"; HAL Science; [Technical Report] IAS-UVA-01-02; 2001; 13 Pages.

Monath et al.; "Scalable Hierarchical Agglomerative Clustering"; KDD'21; 2021; pp. 1245-1255.

Murtagh et al.; "Algorithms for Hierarchical Clustering: An Overview"; WIREs Data Mining Knowl. Discov.; vol. 00; 2011; 12 Pages.

Roux; "A Comparitive Study of Divisive and Agglomerative Hierarchical Clustering Algorithms"; HAL Open Science; Journal of Classification; vol. 35, No. 2; 2018; pp. 345-366.

* cited by examiner

100 ⟍

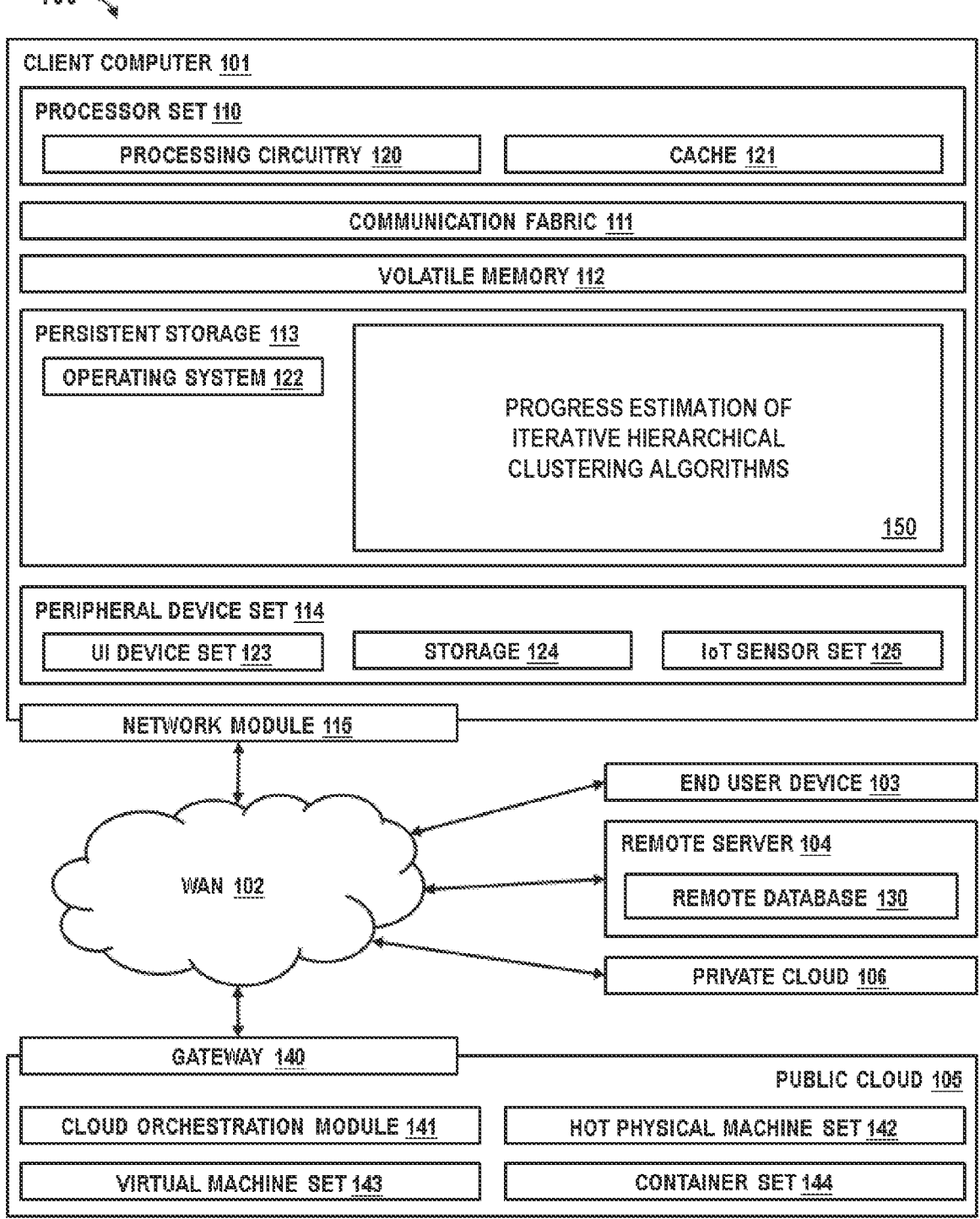

CLIENT COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

PROGRESS ESTIMATION OF ITERATIVE HIERARCHICAL CLUSTERING ALGORITHMS

150

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOT PHYSICAL MACHINE SET 142

VIRTUAL MACHINE SET 143          CONTAINER SET 144

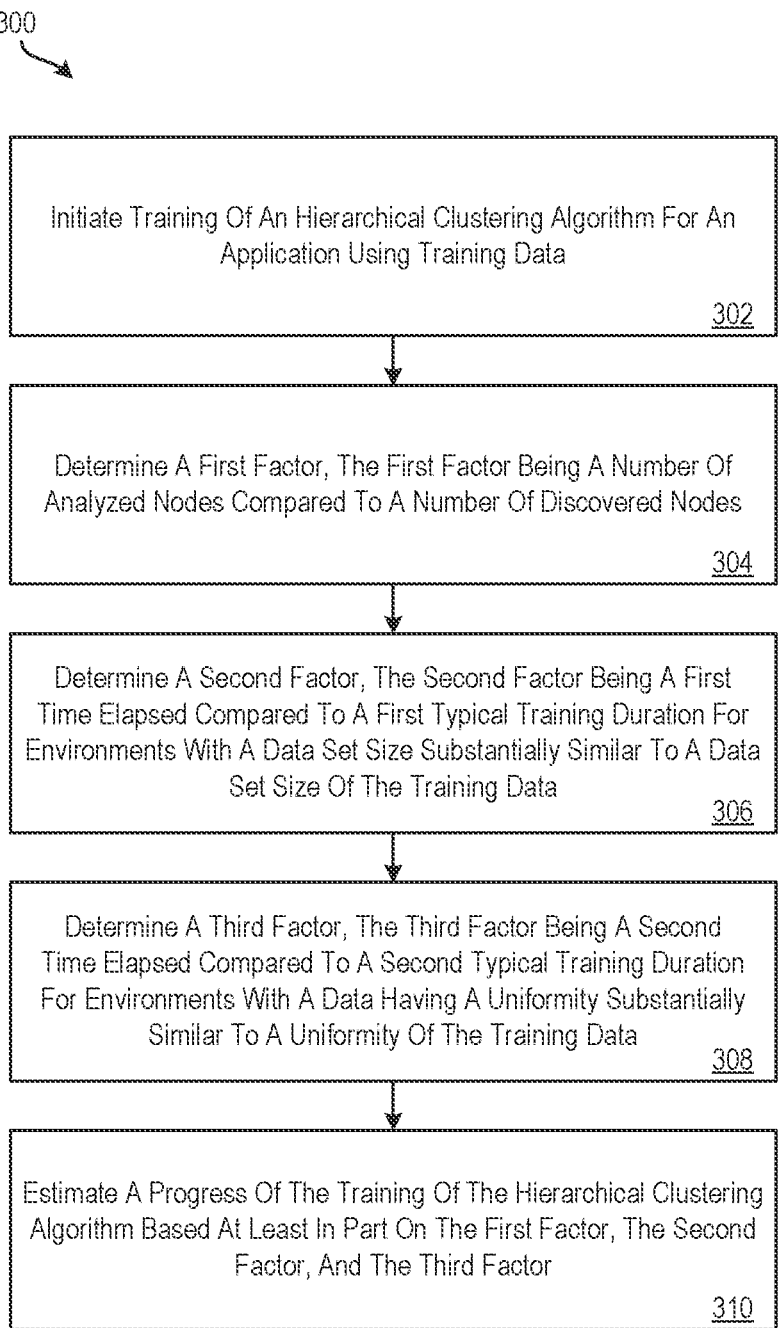

Initiate Training Of An Hierarchical Clustering Algorithm For An
Application Using Training Data

302

Determine A First Factor, The First Factor Being A Number Of
Analyzed Nodes Compared To A Number Of Discovered Nodes

304

Determine A Second Factor, The Second Factor Being A First
Time Elapsed Compared To A First Typical Training Duration For
Environments With A Data Set Size Substantially Similar To A Data
Set Size Of The Training Data

306

Determine A Third Factor, The Third Factor Being A Second
Time Elapsed Compared To A Second Typical Training Duration
For Environments With A Data Having A Uniformity Substantially
Similar To A Uniformity Of The Training Data

308

Estimate A Progress Of The Training Of The Hierarchical Clustering
Algorithm Based At Least In Part On The First Factor, The Second
Factor, And The Third Factor

REST API Dispatch 470

POST training/m

HTTP Response

451

Run HCA Training

Representative Environments

452

Gather Telemetry Data

453

Initial Dataset Compression Ratio 463

Hardware Characteristics 462

Duration 461

Initial Dataset Size 460

Formula Generation Engine 464

Typical Duration (compression ratio) 466

Typical Duration (dataset size) 465

450

501

```
calculateF1Estimate() {
    // Assume discovered nodes and analysed nodes count are continuously updated
    throughout training
    // This would be one potential algorithm suitable for a divisive HCA return (analysedNodeCount / discoveredNodeCount);
```

```
calculateF2Estimate() {

// Assume time elapsed is continuously updated elsewhere and dataset size
  was measured at startup historicalProgressEstimate = lookupEstimate(inputDatasetSize,
  hardwareCharacteristics);
  progress = timeElapsed / historicalProgressEstimate;

progress = progress > 100 ? 100 : progress;
  return(progress);
```

```
calculateF3Estimate() {

// Assume time elapsed is continuously updated elsewhere and dataset
    compression ratio was measured // at startup historicalProgressEstimate = lookupEstimate(inputDatasetCompressionRatio,
    hardwareCharacteristics);

progress = timeElapsed / historicalProgressEstimate;
    progress = progress > 100 ? 100 : progress;

return(progress);
```

*FIG. 5C*

Figure 5D:
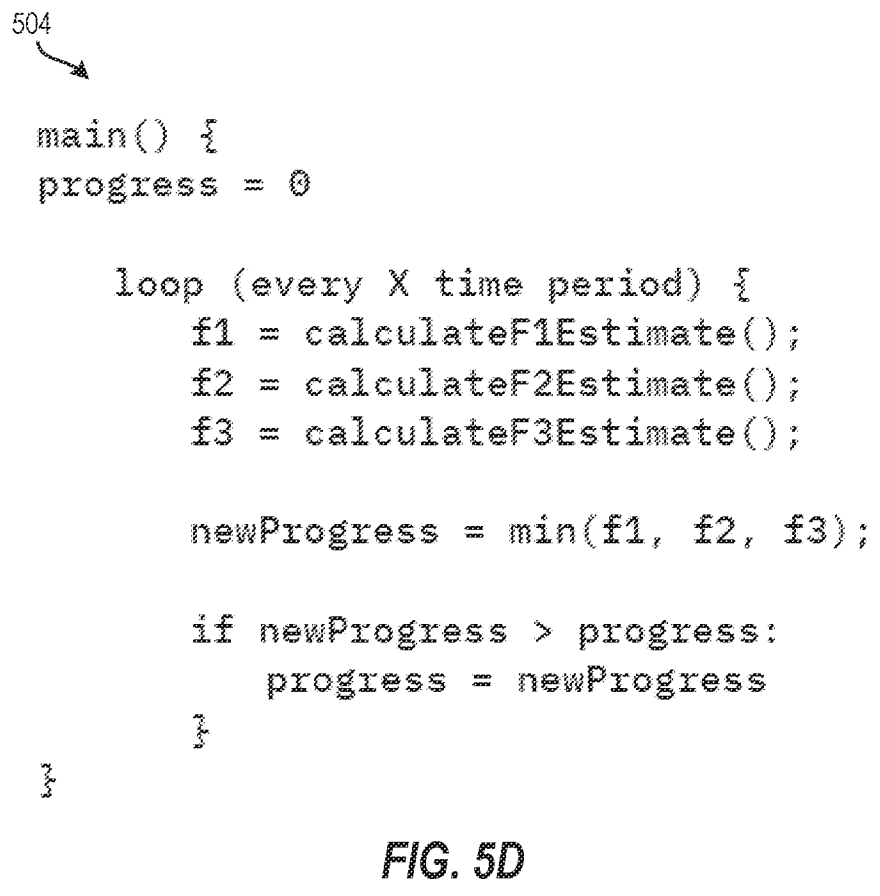

```
main() {
  progress = 0 loop (every X time period) {
    f1 = calculateF1Estimate();
    f2 = calculateF2Estimate();
    f3 = calculateF3Estimate();

newProgress = min(f1, f2, f3);

if newProgress > progress:
      progress = newProgress
  }
}
```

PROGRESS ESTIMATION OF ITERATIVE HIERARCHICAL CLUSTERING ALGORITHMS

BACKGROUND

Embodiments described herein generally relate to processing systems, and more specifically, to progress estimation of iterative hierarchical clustering algorithms.

In machine learning, systems to produce inferential and outlier outcomes from feature models have a classic realization in systems that hierarchically bootstrap their way into model population from the processing of inputs on an initially unpopulated knowledge and feature/value base. This can be referred to as untrained machine learning.

In such systems, many untrained machine learning application functions use hierarchical clustering algorithms (HCAs) to gain insights into data that can be used to enhance decision making and improve user experiences. Applications that utilize machine learning algorithms have a training period where historical data is first gathered and then processed to uncover relationships and insights in the historical data. These insights are captured and used at run-time to enhance workflows. This is an immensely valuable approach in many environments, as it can provide insights into data that is specific to the environment where the application is running.

SUMMARY

In one exemplary embodiment, a computer-implemented method for progress estimation for training hierarchical clustering algorithms is provided. The method includes initiating training of an hierarchical clustering algorithm for an application using training data. The method further includes determining a first factor, the first factor being a number of analyzed nodes compared to a number of discovered nodes. The method further includes determining a second factor, the second factor being a first time elapsed compared to a first typical training duration for environments with a data set size substantially similar to a data set size of the training data. The method further includes determining a third factor, the third factor being a second time elapsed compared to a second typical training duration for environments with a data having a uniformity substantially similar to a uniformity of the training data. The method further includes estimating a progress of the training of the hierarchical clustering algorithm based at least in part on the first factor, the second factor, and the third factor.

In another exemplary embodiment, a system is provided. The system includes a memory having computer readable instructions and a processing device for executing the computer readable instructions. The computer readable instructions control the processing device to perform operations for progress estimation for training hierarchical clustering algorithms. The operations include initiating training of an hierarchical clustering algorithm for an application using training data. The operations include determining a first factor, the first factor being a number of analyzed nodes compared to a number of discovered nodes. The operations include determining a second factor, the second factor being a first time elapsed compared to a first typical training duration for environments with a data set size substantially similar to a data set size of the training data. The operations include determining a third factor, the third factor being a second time elapsed compared to a second typical training duration for environments with a data having a uniformity substantially similar to a uniformity of the training data. The operations include estimating a progress of the training of the hierarchical clustering algorithm based at least in part on the first factor, the second factor, and the third factor.

In another exemplary embodiment, a computer program product is provided. The computer program product includes a computer readable storage medium having program instructions embodied therewith, the program instructions executable by a processor to cause the processor to perform operations for progress estimation for training hierarchical clustering algorithms. The operations include initiating training of an hierarchical clustering algorithm for an application using training data. The operations further include determining a first factor, the first factor being a number of analyzed nodes compared to a number of discovered nodes. The operations further include determining a second factor, the second factor being a first time elapsed compared to a first typical training duration for environments with a data set size substantially similar to a data set size of the training data. The operations further include determining a third factor, the third factor being a second time elapsed compared to a second typical training duration for environments with a data having a uniformity substantially similar to a uniformity of the training data. The operations further include estimating a progress of the training of the hierarchical clustering algorithm based at least in part on the first factor, the second factor, and the third factor.

In addition to one or more of the features described herein, or as an alternative, further embodiments may include that the first factor is determined during the training of the hierarchical clustering algorithm, and that the second factor and the third factor are determined in part prior to initiating the training of the hierarchical clustering algorithm.

In addition to one or more of the features described herein, or as an alternative, further embodiments may include that the second factor and the third factor are determined by gathering data about duration, data volume, and data compression from a plurality of deployments where the training has been performed previously.

In addition to one or more of the features described herein, or as an alternative, further embodiments may include that the second factor and the third factor are scaled based at least in part on a hardware configuration of a device performing the training.

In addition to one or more of the features described herein, or as an alternative, further embodiments may include that the progress of the training is based at least in part on a minimum percentage reported by each of the first factor, the second factor, and the third factor.

In addition to one or more of the features described herein, or as an alternative, further embodiments may include updating the progress of the training over time to a new progress responsive to determining that the new progress is greater than the progress.

In addition to one or more of the features described herein, or as an alternative, further embodiments may include iteratively updating the first factor, the second factor, and the third factor while training the hierarchical clustering algorithm.

Example embodiments of the disclosure include or yield various technical features, technical effects, and/or improvements to technology. Example embodiments of the disclosure provide for progress estimation of iterative hierarchical clustering algorithms based on the following factors: a number of analyzed nodes compared to a number of discovered nodes, a first time elapsed compared to a first typical training duration for environments with a data set size substantially similar to a data set size of the training data, and a second time elapsed compared to a second typical training duration for environments with a data having a uniformity substantially similar to a uniformity of the training data. These aspects of the disclosure constitute technical features that yield the technical effect of providing progress estimation that accounts for the highly dynamic, iterative, indeterminate nature of HCAs without sacrificing the accuracy of the algorithm. Providing improved progress estimation for iterative hierarchical clustering algorithms, especially in the context of security applications for example, results an improvement to computer functionality. For example, by providing more accurate estimates for training HCAs used for security applications, the security application can be implemented more quickly, resulting in detecting security threats earlier. As a result of these technical features and technical effects, a progress estimation for HCA training in accordance with example embodiments of the disclosure represents an improvement to existing HCA training estimation techniques. It should be appreciated that the above examples of technical features, technical effects, and improvements to technology of example embodiments of the disclosure are merely illustrative and not exhaustive.

The above features and advantages, and other features and advantages, of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 1 depicts a block diagram of a processing system for implementing one or more embodiments described herein;

FIG. 3 depicts a flow diagram of a method for progress estimation for training hierarchical clustering algorithms according to one or more embodiments described herein;

FIGS. 5A, 5B, and 5C depict examples of pseudo-code for determining factors for progress estimation according to one or more embodiments described herein; and FIG. 5D depicts examples of pseudo-code for progress estimation according to one or more embodiments described herein.

Figure 2:
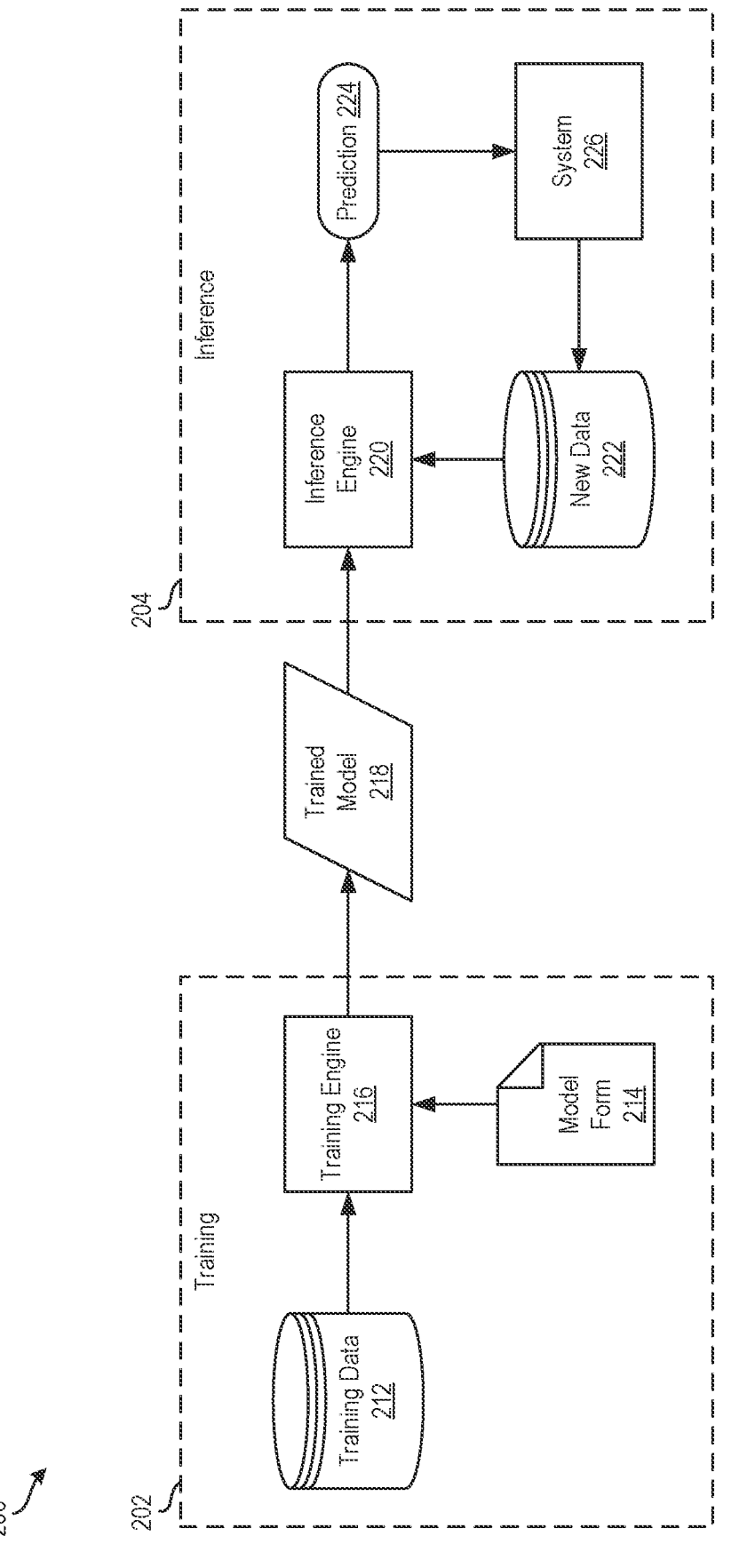
FIG. 2 depicts a block diagram of components of a machine learning training and inference system according to one or more embodiments described herein.

The diagrams depicted herein are illustrative. There can be many variations to the diagram or the operations described therein without departing from the scope of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the described herein provide for progress estimation of iterative hierarchical clustering algorithms.

Some unsupervised machine learning models use hierarchical clustering algorithms (HCAs) across a range of applications, such as security products, big data, social media, finance, medical, research, customer/market classification, and/or the like, including combinations and/or multiples thereof. HCAs analyze data to create clusters and build a hierarchy of the clusters. HCAs can be agglomerative or divisive. Agglomerative HCAs provide a bottom-up approach to clustering where data is originally organized into individual clusters, and clusters are merged moving up the hierarchy. Divisive HCAs provide a top-down approach where data is organized into a single cluster and then divided into smaller clusters moving down the hierarchy.

Training for HCAs can be time consuming. As a result, users may be uncertain when they can expect to begin receiving insights from an application that uses an HCA. Some level of accurate initial training progress estimation is useful for setting user expectations. However, providing an end user an accurate progress estimate is often not possible because of the dynamic and iterative nature of HCAs. In some time-critical applications, such as cyber-security or healthcare tools, it is especially important to provide users with accurate progress estimation for HCAs.

In certain application domains, initial training for HCAs can be seen as a batch job where expectations are that such training could be time consuming to execute, resulting in sometimes extensive delays until the trained model can become useful for subsequent observations. As an example, for a security application, time may be of the essence both in terms of the nature of threats and the expectations of a user to be able to detect those threats. This contrasts with other types of applications, such as for image analysis, where accuracy of recognition is the primary factor regardless (more or less) of processing time and resources in an initial training phase. However, for time-sensitive applications, such as for threat intelligence, compelling analytics may outweigh the urgency of a level of model usability in combination with the idealized precision of that model.

In practical terms, there are at least two ramifications of providing a usable model for threat intelligence even though the model may not have reached an idealized precision. The first is that, from the perspective of threat detection and intelligence collection, an initial level of false positive outcomes may be tolerable, particularly if the continuing adaptive maturity of the model reduces those false positives. The second is that for any sort of interactive perspective, some level of accurate progress estimation as to initial training is important for setting user expectations. One or more embodiments described herein addresses the second, namely by providing for progress estimation of iterative hierarchical clustering algorithms.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as progress estimation of iterative hierarchical clustering algorithms 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

One or more embodiments described herein can utilize machine learning techniques to perform tasks, such as to detect security threats in a security application, where network traffic patterns are baselined and anomalies from the baseline (which may be indicative of cyber-attacks occurring) are detected in real-time or near-real-time. More specifically, one or more embodiments described herein can incorporate and utilize rule-based decision making and artificial intelligence (AI) reasoning to accomplish the various operations described herein. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," and/or "trained machine learning model") can be used to detect security threats in a security application, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of detecting security threats in a security application as described herein.

Systems for training and using a machine learning model are now described in more detail with reference to FIG. 2. Particularly, FIG. 2 depicts a block diagram of components of a machine learning training and inference system 200 according to one or more embodiments described herein. The machine learning training and inference system 200 performs training 202 and inference 204. During training 202, a training engine 216 trains a model (e.g., the trained model 218) to perform a task, such as to detect security threats in a security application. Inference 204 is the process of implementing the trained model 218 to perform the task, such as to detect security threats in a security application, in the context of a larger system (e.g., a system 226). All or a portion of the system machine learning training and inference shown in FIG. 2 can be implemented, for example by all or a subset of the computing environment 100 of FIG. 1.

The training 202 begins with training data 212, which may be structured or unstructured data. According to one or more embodiments described herein, the training data 212 includes data collected during the training of HCAs in various environments, including representative environments that are representative of an environment where a particular security application may be deployed. Hierarchical clustering is a popular technique in unsupervised machine learning, which takes datasets and clusters data with similar properties (or "features"), forming a tree structure, where nodes in the tree divide the dataset based on features of the data. Nodes that are not divided further are referred to as "leaf nodes" and represent a cluster of data that has similar features. This process is iterative and the HCA has the freedom to choose which feature to split data on to generate a balanced tree. As a result, when training begins it is impossible to know what features will be divided on or how many nodes will be in the tree once training has completed. Throughout training, the HCA algorithm can track the number of currently discovered nodes and the number of nodes that it has processed but this information is unsuitable as a metric for estimating progress of the HCA training as the number of discovered nodes will continue to grow dramatically as more nodes are analyzed. This phenomenon could result in the progress estimation reducing (instead of advancing) or stalling. For example, at a first interval, a number of discovered nodes is 23 and a number of analyzed nodes is 12, resulting in a "progress" of about 52%. At a second interval, the number of discovered nodes increases to 27 but the number of analyzed nodes only increases to 13, resulting in a "progress" of about 48%. As a result, the progress actually decreased even though the number of discovered nodes and the number of analyzed nodes both increased. That is, even though an additional node was analyzed, the progress percentage decreased because more nodes were discovered.

As described herein, HCAs can be agglomerative or divisive. An agglomerative procedure operates, most simply stated, "bottom up." Each step of the procedure takes some leaf cluster in the current hierarchy set and merges it with the two closest clusters (which will start out in the hierarchy construction being leaf nodes). "Closest" in this context may start being seeded as simply the mean value of distances between hierarchy clusters, $D(C_p \cdot C_q)$. Ultimately, this maintains a set ordering where if a cluster C is included in a cluster C', the node levels $L_C$ and $L_{C'}$ are in an increasing order:

$$C \subseteq C' \rightarrow L_C \leq L'_C$$

Divisive algorithms, on the other hand, operate "top down." Starting from the whole sample in a cluster, that cluster is split into two subclusters to create a bipartition, and then those subclusters are split again, recursing through the sample set. Divisive clustering has the disadvantage of being more complex, and ultimately more time consumptive, to a worst case algorithmic order of O(2n), although some means of splitting such as k-means heuristics can typically tame this significantly. Divisive means do tend to create more accurate results. Agglomerative clustering is better on operating on input samples which are themselves more initially flat. For this reason, agglomerative algorithms, rather than divisive algorithms, tend to be more frequently implemented in machine learning. It should be appreciated that the techniques for progress estimation of iterative hierarchical clustering algorithms can apply to both agglomerative and divisive algorithms.

Hierarchical clustering algorithm exercise can be employed in a security context, where network traffic patterns are baselined and anomalies from the baseline (indicative of cyber-attacks taking place) can be detected in real-time. Since network traffic is different in feature detail in different environments, the HCA should be trained on data specific to that environment and historical network data. Such data can be gathered for performing hierarchical clustering algorithm training as training data 212.

Network traffic can be received, for example, in packet form, where a unidirectional flow can be denoted as $$f = \sum_{i=1}^{n} p(i),$$

mostly providing the control and data transfer temporal context of a connection oriented bearer protocol such at transmission control protocol (TCP). In the preceding equation, "f" represents the flow of data, "p" represents packets, and "n" represents the number of packets to provide modeling flow of network traffic. This flow data can then be analyzed for conformance or deviation of any existing model, which has been cumulatively established describing the conforming traffic state of the network under observation.

With continued reference to FIG. 2, the training engine 216 receives the training data 212 and a model form 214. The model form 214 represents a base model that is untrained. The model form 214 can have preset weights and biases, which can be adjusted during training. It should be appreciated that the model form 214 can be selected from many different model forms depending on the task to be performed. For example, where the training 202 is to train a model to detect security threats in a security application, the model form 214 may be a model form of a HCA. The training 202 can be supervised learning, semi-supervised learning, unsupervised learning, reinforcement learning, and/or the like, including combinations and/or multiples thereof. For example, unsupervised learning can be used to train an HCA to predict security threats based on network traffic. To do this, the training engine 216 takes as input a training image from the training data 212 and makes a prediction for a security threat. The training engine 216 then adjusts weights and/or biases of the model based on results of the comparison, such as by using backpropagation. The training 202 may be performed multiple times (referred to as "epochs") until a suitable model is trained (e.g., the trained model 218).

Once trained, the trained model 218 can be used to perform inference 204 to perform a task, such as to detect security threats in a security application. The inference engine 220 applies the trained model 218 to new data 222 (e.g., real-world, non-training data). For example, if the trained model 218 is trained to detect security threats, the new data 222 can be network traffic data that was not part of the training data 212. In this way, the new data 222 represents data to which the model 218 has not been exposed. The inference engine 220 makes a prediction 224 (e.g., a prediction of a security threat using the new data 222) and passes the prediction 224 to the system 226. The system 226 can, based on the prediction 224, taken an action, perform an operation, perform an analysis, and/or the like, including combinations and/or multiples thereof. In some embodiments, the system 226 can add to and/or modify the new data 222 based on the prediction 224.

In accordance with one or more embodiments, the predictions 224 generated by the inference engine 220 are periodically monitored and verified to ensure that the inference engine 220 is operating as expected. Based on the verification, additional training 202 may occur using the trained model 218 as the starting point. The additional training 202 may include all or a subset of the original training data 212 and/or new training data 212. In accordance with one or more embodiments, the training 202 includes updating the trained model 218 to account for changes in expected input data.

One or more embodiments described herein address the challenge estimating progress of hierarchical clustering by combining the current progress of clustering analysis, in the nodal volume and the elapsed execution time associated with progress of clustering of a given data set, along with a comparison to the iterative statistical tracking of data and feature diversity and a comparison to historically tracked clustering execution time and progress for data sets resembling the data set whose analysis is in flight.

One or more embodiments described herein provides for a combination of multiple current and historical indicators to provide for estimating progress of hierarchical clustering node processing and model training. This approach realizes improved estimation accuracy, lowers additional processing overhead, and provides adaptive flexibility in progress prediction. For example, one or more embodiments provides for incorporating the nature, diversity, and feature distribution of data in flight of clustering to hierarchical form without deviating to make abbreviated presumptions about nodal locality that could prove adverse to accuracy in many cases.

Contemporary progress estimation approaches either cannot be applied to HCAs or do not provide a linear representation of progress. One or more embodiments described herein provides for progress estimation of a HCA that gives approximate linear results and accounts for the highly dynamic, iterative, indeterminate nature of HCAs without sacrificing the accuracy of the algorithm.

Figure 4A:
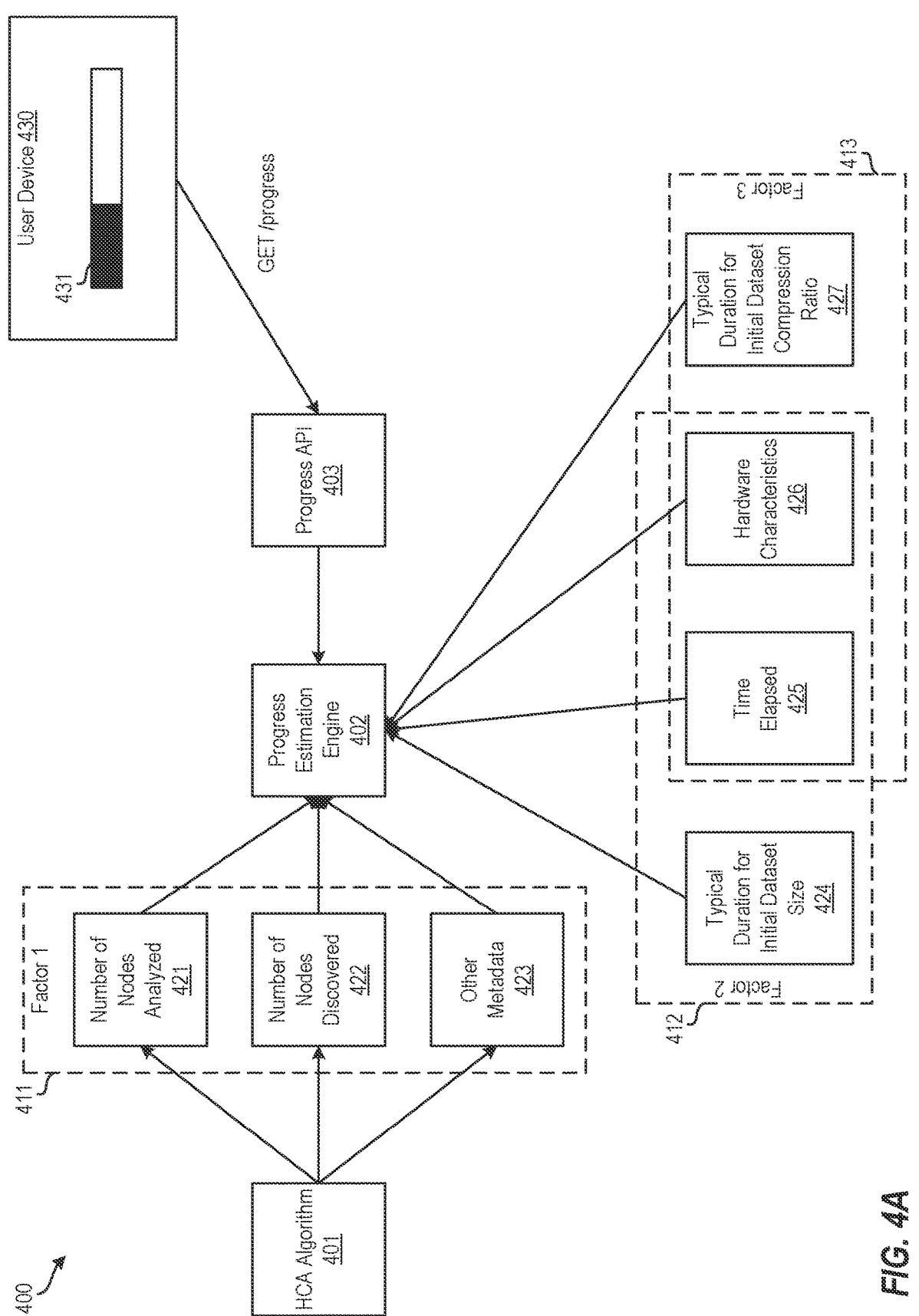
FIG. 4A depicts a block diagram of a system for progress estimation for training hierarchical clustering algorithms according to one or more embodiments described herein.
Figure 4B:
FIG. 4B depicts a block diagram of a system for gathering data used for progress estimation for training hierarchical clustering algorithms according to one or more embodiments described herein.

Turning now to FIG. 3, a method 300 for progress estimation for training hierarchical clustering algorithms is depicted according to one or more embodiments described herein. The method 300 can be implemented using any suitable device or system, such as the computing environment 100 of FIG. 1, the machine learning training and inference system 200 of FIG. 2, the system 400 of FIG. 4A, the system 450 of FIG. 4B, and/or the like, including combinations and/or multiples thereof. The method 300 is now described with reference to FIGS. 4A, 4B, 5A, 5B, 5C, and 5D, but is not so limited. FIG. 4A depicts a block diagram of a system 400 for progress estimation for training hierarchical clustering algorithms according to one or more embodiments described herein. FIG. 4B depicts a block diagram of a system 450 for gathering data used for progress estimation for training hierarchical clustering algorithms according to one or more embodiments described herein. FIGS. 5A, 5B, and 5C depict examples of pseudo-code for determining factors for progress estimation according to one or more embodiments described herein, and FIG. 5D depicts examples of pseudo-code for progress estimation according to one or more embodiments described herein.

With reference to FIG. 3, the method 300 provides for calculating the progress of a hierarchical clustering algorithm using information about the nodes of the HCA discovered and analyzed in the tree, the time elapsed, the typical training duration for similar amounts of data and the typical training duration for datasets with similar degrees of uniformity.

At block 302 of the method 300, the system 400 initiates training of an HCA algorithm 401 for an application (e.g., security threat detection) using training data. For example, a user of the user device 430 can initiate training of the HCA algorithm 401. While the training occurs, a progress estimation engine 402 estimates progress of the training of the HCA algorithm 401 based on multiple factors (e.g., factor 1 411, factor 2 412, and factor 3 413), which are now described with reference to blocks 304, 306, and 308 of FIG. 3 and portions of FIGS. 4A and 4B.

At block 304 of the method 300, the system 400 determines a first factor (e.g., the factor 1 411). The first factor is a number of analyzed nodes compared to a number of discovered nodes. According to an embodiment in which the HCA is an agglomerative HCA, the first factor could be determined as: (total data count−the number of nodes at current tree depth)/total data count. According to an embodiment in which the HCA is a divisive HCA, the first factor could be the number of nodes that have been analyzed and divided versus the number of nodes in the tree that have been discovered (which includes those that have been analyzed, but also those that are yet to be analyzed and divided). According to an embodiment, as shown in FIG. 4A, the factor 1 411 includes a number of nodes analyze 421 and a number of nodes discovered 422. Other metadata 423 can also be considered, where examples of other metadata include, for example, a number of leaf nodes generated. FIG. 5A depicts an example of pseudo-code 501 for determining the first factor (e.g., the factor 1 411) according to one or more embodiments described herein.

At block 306 of the method 300, the system 400 determines a second factor (e.g., the factor 2 412). The second factor is a first time elapsed compared to a first typical training duration for environments with a data set size substantially similar to a data set size of the training data. According to one or more embodiments described herein, the second factor is created by gathering data about duration and data volume from a variety of deployments where the training process has run in the past. According to an embodiment, as shown in FIG. 4A, the factor 2 412 includes a typical duration for initial dataset size 424, a time elapsed 425, and hardware characteristics 426. FIG. 5B depicts an example of pseudo-code 502 for determining the second factor (e.g., the factor 2 412) according to one or more embodiments described herein.

At block 308 of the method 300, the system 400 determines a third factor (e.g., the factor 3 413). The third factor is a second time elapsed compared to a second typical training duration for environments with a data having a uniformity (or variation) substantially similar to a uniformity of the training data. Often, there are properties across data points that clustering algorithms use to partition the data. The variety within these properties can indicate information about the data, such as how many clusters are likely to be formed. An example in the case of network traffic is the use of properties like flow direction (e.g., ingress, egress, lateral, external), protocol, application, source port, destination port, and/or the like, including combinations and/or multiples thereof. According to one or more embodiments described herein, the third factor is created by gathering data about duration and data compression from a variety of deployments where the training process has run in the past. According to an embodiment, as shown in FIG. 4A, the factor 3 413 includes a typical duration for initial dataset compression ration 427 along with the time elapsed 425 and the hardware characteristics 426. FIG. 5C depicts an example of pseudo-code 503 for determining the third factor (e.g., the factor 3 413) according to one or more embodiments described herein.

At block 310 of the method 300, the progress estimation engine 402 of the system 400 estimates a progress of the training of the hierarchical clustering algorithm based at least in part on the first factor, the second factor, and the third factor. FIG. 5D depicts an example of pseudo-code 504 for progress estimation for training hierarchical clustering algorithms according to one or more embodiments described herein. The progress variable in the main function of the pseudo-code 504 is the value returned to the user at the user device 430 via a progress application programming interface (API) 403 or via any other suitable approach for providing the progress to the user. For example, the user device 430 requests the progress from the system 400 by sending the request via the progress API 403. The progress API 403 receives the progress from the progress estimation engine 402 and returns the progress to the user device 430. According to an embodiment, the progress is displayed visually on the user device (e.g., on a display), as a status indicator 431. The status indicator 431 can be any indicator for presenting the progress to the user, such as a status bar, a textual representation (e.g., a percentage), and/or the like, including combinations and/or multiples thereof. The progress API 403 may be a representational state transfer (REST) API, serving both model training control and progress retrieval. According to one or more embodiments described herein, during the HCA run-time training, the progress estimation engine 402 constantly or iteratively collects the determines each factor (e.g., the factor 1 411, the factor 2 412, and the factor 3 413) and combines the factors as shown pseudo-code 501-504 of FIGS. 5A-5D.

According to one or more embodiments described herein, the progress estimation engine 402 can scale the factor 2 412 and/or the factor 3 413 to account for the hardware specifications of the device performing the training. Examples of such hardware specifications include available memory, processor speed (e.g., BogoMIPS), processor capability, and the non-uniform memory access (NUMA) topology of the processing elements involved, and/or the like, including combinations and/or multiples thereof.

The progress estimation engine 402 can consider each of the factor 1 411, the factor 2 412, and the factor 3 413. According to one or more embodiments described herein, the factors can be weighted differently depending on the progress. For example, factor 1 411 may be a more reliable indicator of progress once the HCA is closer to completion, because it becomes less likely for new nodes to be discovered and the majority of the work remaining is simply processing work. As another example, factor 2 412 and factor 3 413 can provide a more accurate estimation of progress at the beginning of training, as these factors look at characteristics of historical training patterns to estimate progress.

The progress estimation engine 402 can combine the factors (e.g., the factor 1 411, the factor 2 412, and the factor 3 413) in different ways. According to an embodiment, the factors can be combined conservatively, such that the estimated progress is a conservative estimate. For example, the factor 411 1 may overestimate progress until close to the end of the training period while the factor 2 412 and the factor 3 413 have the potential to either overestimate or underestimate the progress but with robust datasets they become more accurate. According to one or more embodiments described herein, these factors are combined to take a minimum percentage reported by the factors (provided it would not cause the progress to be reduced), although other approaches are also possible, such as taking a maximum percentage, taking an average/mean percentage, taking a median percentage, and/or the like, including combinations and/or multiples thereof. The minimum approach provides a low-water mark such that any percentage increase in progress is a conservative one that in line with each of the three factors. This results in progress estimation that is much closer to linear throughout the training period as compared to using any one factor which may spike and stall throughout training.

The data for the factor 2 412 and the factor 3 413 can be gathered, for example, as shown in FIG. 4B using the system 450. The system 450 runs HCA training 451 on different representative environments 452 and gathers telemetry data 453. Examples of telemetry data 453 include an initial dataset size 460, a duration 461, hardware characteristics 462, and initial dataset compression ratio 463. A formula generation engine 464 can generate typical durations based on dataset size (block 465) and/or compression ratio (block 466). For example, the typical duration for dataset size (block 465) can be a function of the initial dataset size 460 and the hardware characteristics 462. As another example, the typical duration for dataset compression ratio (block 466) can be a function of the initial dataset compression ratio 463 and the hardware characteristics 462.

In the data gathering phase, the application developer is responsible for gathering the data to form the factor 2 412 and the factor 3 413. This can be done by running the training algorithm in a large variety of environments (e.g., the representative environments 452) and gathering statistics (e.g., the telemetry data 453) about training duration, dataset volumes, dataset compression ratios, and hardware characteristics. Note, that the collection of this data can be automated and scaled by gathering this telemetry from deployed instances of the application, forming an ongoing feedback loop that continuously improves the factor 2 412 and the factor 3 413. These data points are then used to create a generalized formula that describes the relationship between duration, dataset volume and dataset compression for that particular HCA algorithm and its typical application. These resulting formulas are encoded into the progress estimation as the factor 2 412 and the factor 3 413. In the example of the pseudo-code 501-504, these formulas are encoded into the "lookupEstimate( )" function. The system 450 can post the resulting formulas, for example, into the REST API dispatch 470, which can generate an HTTP response as shown.

Additional processes also may be included in the method 300. According to an embodiment, the first factor is determined during the training of the hierarchical clustering algorithm, and the second factor and the third factor are determined prior to initiating the training of the hierarchical clustering algorithm.

According to an embodiment, the second factor and the third factor are scaled based at least in part on a hardware configuration of a device performing the training.

According to an embodiment, the second factor and the third factor are scaled based at least in part on a hardware configuration of a device performing the training.

According to an embodiment, the progress of the training is based at least in part on a minimum percentage reported by each of the first factor, the second factor, and the third factor.

According to an embodiment, the uniformity is based on a source address, a destination address, a port, a protocol, and a flow direction.

According to an embodiment, the method 300 further includes updating the progress of the training over time to a new progress responsive to determining that the new progress is greater than the progress.

According to an embodiment, the method 300 further includes iteratively updating the first factor, the second factor, and the third factor while training the hierarchical clustering algorithm.

It should be understood that the process depicted in FIG. 3 represents an illustration, and that other processes may be added or existing processes may be removed, modified, or rearranged without departing from the scope of the present disclosure.

Example embodiments of the disclosure include or yield various technical features, technical effects, and/or improvements to technology. Example embodiments of the disclosure provide for progress estimation of iterative hierarchical clustering algorithms based on the following factors: a number of analyzed nodes compared to a number of discovered nodes, a first time elapsed compared to a first typical training duration for environments with a data set size substantially similar to a data set size of the training data, and a second time elapsed compared to a second typical training duration for environments with a data having a uniformity substantially similar to a uniformity of the training data. These aspects of the disclosure constitute technical features that yield the technical effect of providing progress estimation that accounts for the highly dynamic, iterative, indeterminate nature of HCAs without sacrificing the accuracy of the algorithm. Providing improved progress estimation for iterative hierarchical clustering algorithms, especially in the context of security applications for example, results an improvement to computer functionality. For example, by providing more accurate estimates for training HCAs used for security applications, the security application can be implemented more quickly, resulting in detecting security threats earlier. As a result of these technical features and technical effects, a progress estimation for HCA training in accordance with example embodiments of the disclosure represents an improvement to existing HCA training estimation techniques. It should be appreciated that the above examples of technical features, technical effects, and improvements to technology of example embodiments of the disclosure are merely illustrative and not exhaustive.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for progress estimation for training hierarchical clustering algorithms, the computer-implemented method comprising:
   initiating training of an hierarchical clustering algorithm for an application using training data;
   calculating, while the hierarchical clustering algorithm is being trained, a first factor, the first factor being a number of analyzed nodes compared to a number of discovered nodes, wherein the analyzed nodes and the discovered nodes are continuously updated throughout training of the hierarchical clustering algorithm;
   determining a second factor, the second factor being a first time elapsed compared to a first typical training duration for environments with a data set size substantially similar to a data set size of the training data, wherein the first time elapsed is continuously updated;
   determining a third factor, the third factor being a second time elapsed compared to a second typical training duration for environments with a data having a uniformity substantially similar to a uniformity of the training data, wherein the second time elapsed is continuously updated; and
   estimating a progress of the training of the hierarchical clustering algorithm based at least in part on the first factor, the second factor, and the third factor.

2. The computer-implemented method of claim 1, wherein the first factor is determined during the training of the hierarchical clustering algorithm, and wherein the second factor and the third factor are determined in part prior to initiating the training of the hierarchical clustering algorithm.

3. The computer-implemented method of claim 1, wherein the second factor and the third factor are determined by gathering data about duration, data volume, and data compression from a plurality of deployments where the training has been performed previously.

4. The computer-implemented method of claim 1, wherein the second factor and the third factor are scaled based at least in part on a hardware configuration of a device performing the training.

5. The computer-implemented method of claim 1, wherein the progress of the training is based at least in part on a minimum percentage reported by each of the first factor, the second factor, and the third factor.

6. The computer-implemented method of claim 1, further comprising updating the progress of the training over time to a new progress responsive to determining that the new progress is greater than the progress.

7. The computer-implemented method of claim 1, further comprising iteratively updating the first factor, the second factor, and the third factor while training the hierarchical clustering algorithm.

8. A system comprising:
   a memory comprising computer readable instructions; and
   a processing device for executing the computer readable instructions, the computer readable instructions controlling the processing device to perform operations for progress estimation for training hierarchical clustering algorithms, the operations comprising:
      initiating training of an hierarchical clustering algorithm for an application using training data;
      calculating, while the hierarchical clustering algorithm is being trained, a first factor, the first factor being a number of analyzed nodes compared to a number of discovered nodes, wherein the analyzed nodes and the discovered nodes are continuously updated throughout training of the hierarchical clustering algorithm;
      determining a second factor, the second factor being a first time elapsed compared to a first typical training duration for environments with a data set size substantially similar to a data set size of the training data, wherein the first time elapsed is continuously updated;
      determining a third factor, the third factor being a second time elapsed compared to a second typical training duration for environments with a data having a uniformity substantially similar to a uniformity of the training data, wherein the second time elapsed is continuously updated; and
      estimating a progress of the training of the hierarchical clustering algorithm based at least in part on the first factor, the second factor, and the third factor.

9. The system of claim 8, wherein the first factor is determined during the training of the hierarchical clustering algorithm, and wherein the second factor and the third factor are determined in part prior to initiating the training of the hierarchical clustering algorithm.

10. The system of claim 8, wherein the second factor and the third factor are determined by gathering data about duration, data volume, and data compression from a plurality of deployments where the training has been performed previously.

11. The system of claim 8, wherein the second factor and the third factor are scaled based at least in part on a hardware configuration of a device performing the training.

12. The system of claim 8, wherein the progress of the training is based at least in part on a minimum percentage reported by each of the first factor, the second factor, and the third factor.

13. The system of claim 8, wherein the operations further comprise updating the progress of the training over time to a new progress responsive to determining that the new progress is greater than the progress.

14. The system of claim 8, wherein the operations further comprise iteratively updating the first factor, the second factor, and the third factor while training the hierarchical clustering algorithm.

15. A computer program product comprising a computer readable storage medium having program instructions embodied therewith, the program instructions executable by a processor to cause the processor to perform operations for progress estimation for training hierarchical clustering algorithms, the operations comprising:

initiating training of an hierarchical clustering algorithm for an application using training data;

calculating, while the hierarchical clustering algorithm is being trained, a first factor, the first factor being a number of analyzed nodes compared to a number of discovered nodes, wherein the analyzed nodes and the discovered nodes are continuously updated throughout training of the hierarchical clustering algorithm;

determining a second factor, the second factor being a first time elapsed compared to a first typical training duration for environments with a data set size substantially similar to a data set size of the training data, wherein the first time elapsed is continuously updated;

determining a third factor, the third factor being a second time elapsed compared to a second typical training duration for environments with a data having a uniformity substantially similar to a uniformity of the training data, wherein the second time elapsed is continuously updated; and estimating a progress of the training of the hierarchical clustering algorithm based at least in part on the first factor, the second factor, and the third factor.

16. The computer program product of claim 15, wherein the first factor is determined during the training of the hierarchical clustering algorithm, and wherein the second factor and the third factor are determined in part prior to initiating the training of the hierarchical clustering algorithm.

17. The computer program product of claim 15, wherein the second factor and the third factor are determined by gathering data about duration, data volume, and data compression from a plurality of deployments where the training has been performed previously.

18. The computer program product of claim 15, wherein the second factor and the third factor are scaled based at least in part on a hardware configuration of a device performing the training.

19. The computer program product of claim 15, wherein the progress of the training is based at least in part on a minimum percentage reported by each of the first factor, the second factor, and the third factor.

20. The computer program product of claim 15, wherein the operations further comprise updating the progress of the training over time to a new progress responsive to determining that the new progress is greater than the progress.

* * * * *